Patented Feb. 15, 1927.

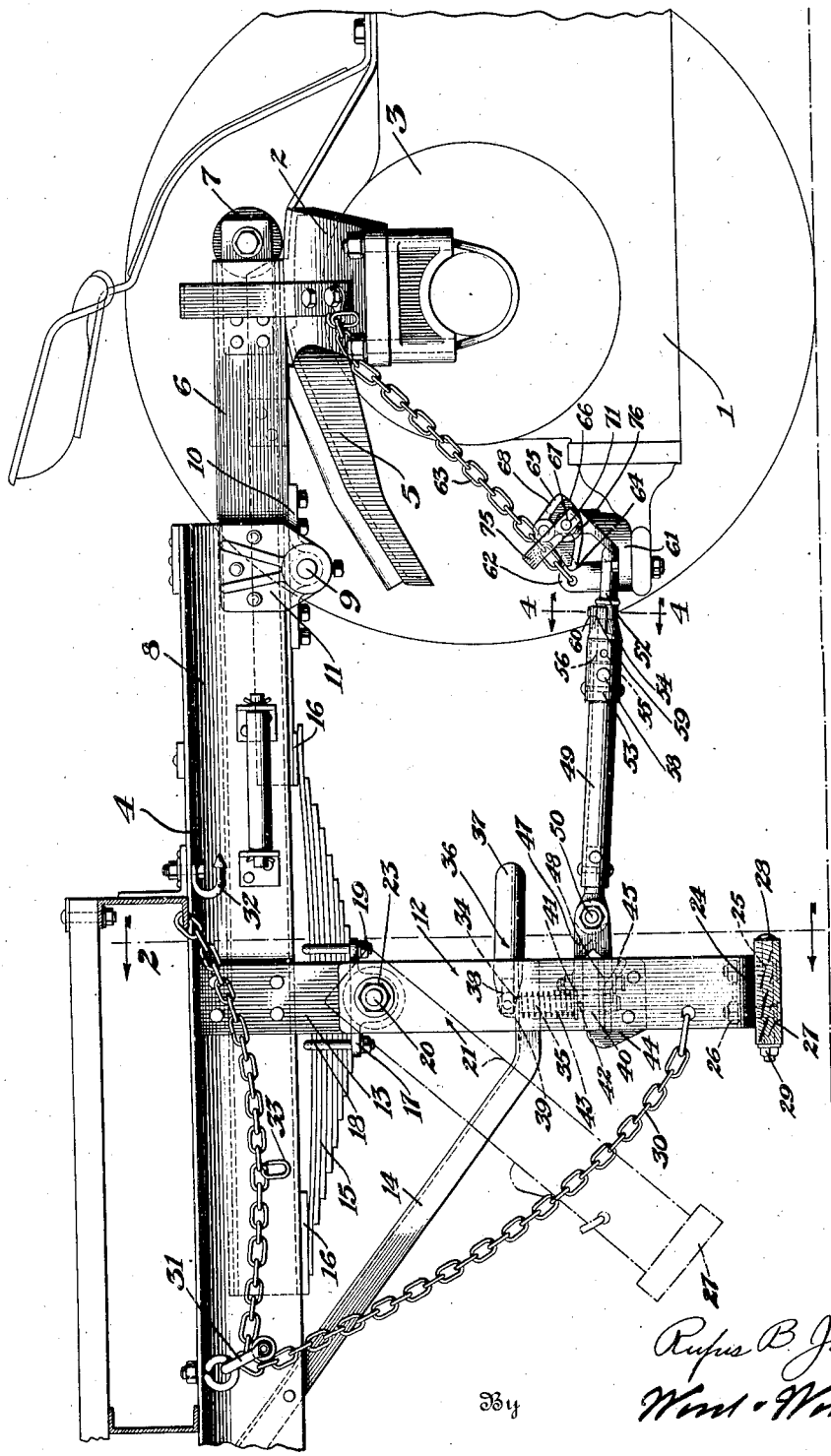

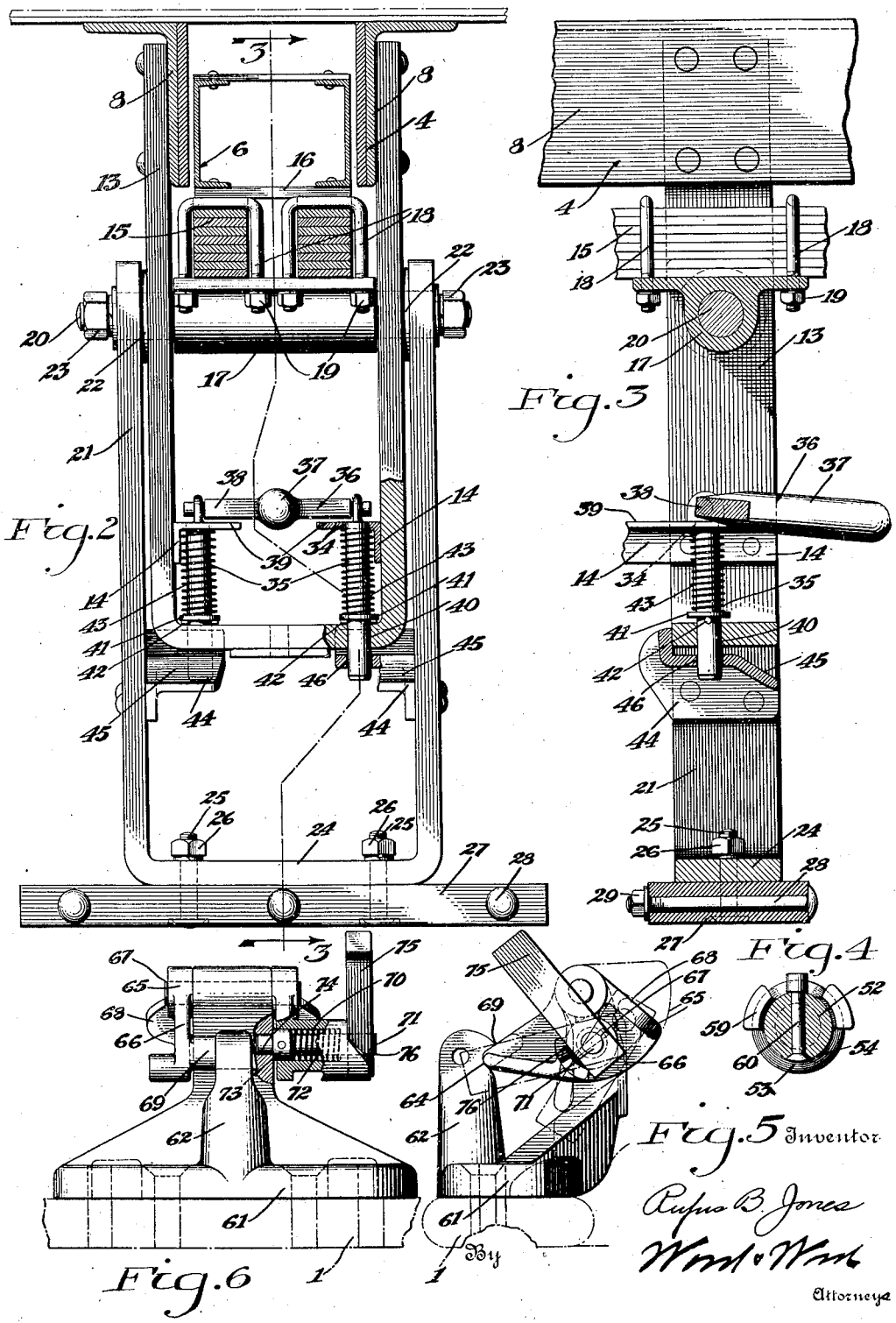

1,617,714

UNITED STATES PATENT OFFICE.

RUFUS B. JONES, OF CINCINNATI, OHIO, ASSIGNOR TO THE TRAILMOBILE COMPANY, OF CINCINNATI, OHIO, A CORPORATION OF OHIO.

SEMITRAILER.

Application filed April 27, 1925. Serial No. 26,020.

My invention relates to vehicle trains and is particularly directed to vehicle trains of the type described in application Serial No. 590,804, wherein a tractor is used for a propelling vehicle and a two-wheel trailer for the load carrying vehicle. The trailer is provided at its forward end with a tongue which rests upon a bolster upon the tractor when in coupled position, imposing the weight of the forward end of the trailer thereon, and when disengaging from the tractor the forward end of the trailer rests upon a leg or prop. The draft connection is between the lower portion of the tractor and a portion of the leg of the trailer. This construction tends to keep the front wheels of the tractor on the ground, an action described in the above-mentioned application.

The tongue of the trailer which rests upon the bolster of the tractor is pivoted intermediate its ends to the trailer and the rear end of the tongue is cushioned by a spring. This spring is pivotally secured to the leg of the trailer to permit it to rock. Thus this spring is adapted to hold the tongue in substantial equilibrium and to this feature my invention is particularly directed.

Therefore, one object of my invention is to provide a load sustaining connection between a tractor and a two-wheeled trailer, said connection spring cushioned to minimize jolting of the trailer.

After the tractor and trailer have been connected it is necessary to position the lower or pedal portion of the trailer prop so that it is clear of the ground. This pedal portion is pivoted to the leg portion and secured in its free position by a chain. However, it must be locked in load supporting position before the tractor can be removed from the trailer.

Therefore another object of my invention is to provide a trailer leg and a trailer pedal or ground engaging portion, adapted to be locked together in load sustaining relationship or positioned so that the pedal member is clear of the ground.

The tractor is provided with a pintle over which fits the terminal lunette of the draft link between the trailer leg and the tractor. It is necessary to lock this lunette in its operative position on the pintle to prevent disengagement by jolting or rattling.

Therefore another object of my invention is to provide a lock on a tractor adapted to secure the terminal lunette of the trailer draft connection.

Other objects and certain advantages will appear in the description of the drawings forming a part of this specification, in which:

Figure 1 is a side elevation of my improved trailer construction showing the trailer supported upon and coupled to the rear end of the tractor.

Figure 2 is a sectional view taken on line 2—2, Fig. 1, detailing the construction of the prop.

Figure 3 is a sectional view taken on line 3—3, Fig. 2.

Figure 4 is a sectional view taken on line 4—4, Fig. 1, detailing the construction of the draft connection pivot.

Figure 5 is a detail side view of the pintle bracket and locking mechanism thereon.

Figure 6 is a front view of Fig. 5 with certain parts broken away to show the lock releasing mechanism more clearly.

I provide a tractor 1 having a bolster or bridge 2 over the rear axle housing 3, the bolster 2 being adapted to hold the weight of the forward end of the trailer 4 and having an inclined portion 5 over which the tongue 6 of the trailer 4 is adapted to slide onto the top of the bolster 2 in a load supporting position. The forward end of the tongue 6 is provided with a roller 7 adapted to minimize the friction of the tongue on this inclined portion 5. This tongue 6 and other portions of the trailer 4 are fabricated of channel iron, angle iron and plate iron members riveted together as is now conventional. Intermediate its ends this tongue is pivoted to the center members 8 of the trailer chassis by means of a rod 9 secured to the tongue 6 by means of a plate 10 attached to the tongue and journals 11 secured to the chassis members 8 on opposite sides of the tongue. The tongue extends rearwardly between the members of the chassis frame to a point beyond that at which is located the trailer prop or leg 12. This prop comprises a U-shaped member 13 riveted at its open end to the members of the trailer chassis. Angular brace bars 14 extend rearwardly from intermediate portions of this U-shaped member to the chassis frame. Beneath the rear portion of the tongue are springs 15 of a conventional semielliptical type. The lower side of the tongue is provided with plates 16 which rest on the ends of these springs 15. These springs are pivoted between the side members of the U-shaped leg by means of a bracket 17 secured to the springs by U-shaped bolts 18 which go over the springs and extend through the plate with nuts 19 on their lower ends. A rod 20 extends through the bracket 17 and through the side members of the U-shaped leg. On this same rod 20 a U-shaped pedal member 21 is pivoted to the leg so that it can be swung rearwardly out of contact with the ground on which it rests before the tractor has been backed under the trailer tongue. The pedal member 21 is separated from the leg by washers 22, thus providing clearance between these members and on the outer ends of this rod are nuts 23. On the bottom 24 of this pedal member 21 and secured to the same by means of bolts 25 and nuts 26 is a wooden ground engaging member 27 strengthened by transversely extending bolts 28 and nuts 29. This member is subjected to a good deal of wear due to its immediate engagement with the ground and this construction permits it to be replaced at convenient intervals.

This pedal member is drawn and secured in its free position by means of a chain 30 attached at one end to the lower end of the pedal member, passing over a pulley 31 secured to the chassis in the rear of the leg and secured to the chassis at its forward end. The chassis is provided with a hook 32 adapted to engage the free link 33 in said chain to secure the pedal member in its free position. The rearward extending braces 14 comprise angle bars. These angle bars are bent to a horizontal position where they join the inner sides of the U-shaped leg. Through this portion of the angle bars are apertures 34 through which extend pins 35. These pins are connected at their top by a rock lever or raising lever 36 having a forwardly extending handle 37 which when depressed engages the forwardly extending portion 38 of the lever with the tops 39 of the rearwardly extending braces thereby raising the pins. These pins extend downwardly through apertures 40 in the bottom of the U-shaped leg and are provided with washers 41 above the bottom of this U-shaped member. These washers are slidable on the pins but their downward motion is limited by stop pins 42 on the pins 35. Between these washers and the rearwardly extending braces are springs 43 coiled under tension about the pins. To the inner sides of the U-shaped pedal member are riveted locking brackets 44 comprising laterally extending members inclined at their forward ends providing cam surfaces 45 to engage the bottom of the pins and having apertures 46 in their horizontal portions through which the pins fall when the pedal member is in weight-supporting alignment with the leg.

The terminal link 47 of the drawbar or draft connection between the tractor and trailer is pivoted to the bottom of the U-shaped leg member. This is accomplished by means of a bolt 48 passing through the bottom of the U-shaped member and the terminal link which is yoked over it. To this terminal link is pivoted the intermediate portion 49 of the tractor-trailer draft connection. This pivot comprises a bolt 50 horizontally disposed to permit the intermediate link 49 to swing vertically. The terminal link at the tractor end of this connection comprises a lunette 52 pivoted axially to the intermediate link 49. This is accomplished by means of a sleeve 53 having a restricted neck portion 54 at its forward end through which the stem 55 of the terminal lunette passes, an abutment 56 on the inner end of the lunette stem, and rivets 58 securing the sleeve to the intermediate link 49. This sleeve has two forwardly extending lugs 59 spaced apart a predetermined distance and the stem of the lunette is provided with a pin 60 placed between these lugs which therefore limit the degree of pivoting of the lunette. This drawbar is thus provided with three pivots each one at right angles to the other two pivots. The axial pivot between this terminal lunette and the rest of the draft connection is very serviceable when the wheels of the respective vehicles are on different angles.

To the bottom portion of the tractor is attached the mechanism for engaging and locking the draft connection. This comprises a base member 61 and an upwardly extending pintle 62 over which the terminal lunette of the draft connection is adapted to fit. A chain 63 is attached to the top of this pintle to facilitate threading the lunette over the pintle. The forward surface of the pintle 62 is provided with a notch 64 for the lock 65 which prevents the lunette from becoming disengaged from the pintle. This lock 65 comprises a member, the bifurcated arms 66 of which are pivoted to the base as at 67. This member 65 has a rearwardly extending portion 68 adapted to be engaged by the foot of the operator to close the lock. These arms 66 are joined in the front by a member 69 preferably integral therewith which engages the notch 64 in the pintle 62. One of these bifurcated arms is provided with a tubular recess 70 in which is disposed a latch pin 71 having a coiled spring 72 around it and a collar 73 holding said spring under compression, thereby pressing the pin inwardly. The base to which the lock member is pivoted is provided with a recess 74 into which this latch pin 71 is pressed by the spring when the lock member is in locking position. Secured to the outer end of this latch pin 71 is a lever member 75 operable on a cam surface 76 integral with the lock member so that when depressed the lever withdraws the pin from the recess in the base. The lock member then falls out of locking position so that the lunette can be placed over the pintle or removed from the pintle. When the member is to be locked, the rearwardly extending portion 68 is depressed, the forward portion 69 arises to engagement with the notch 64 and the spring presses the latch pin inwardly into engagement with the base recess, thereby holding the members in locked relationship.

Thus I provide a mechanism for securely locking the terminal lunette of the draft connection between a truck and a trailer in its operative draft position over the pintle of a tractor member.

Having described my invention, I claim:

1. In a vehicle of the class described, a chassis frame, a tongue intermediately pivotally secured to the frame upon a horizontal axis with its forward end extending longitudinally beyond the frame, and a leaf spring pivotally mounted upon said frame and extending longitudinally with the tongue, with the opposite ends thereof providing yielding bearings for said tongue.

2. In a vehicle of the class described, a chassis frame, a tongue intermediately pivotally secured to the frame upon a horizontal axis with its forward end extending longitudinally beyond the frame, and a leaf spring mounted upon said frame beneath the tongue and extending longitudinally with the tongue, with the opposite ends thereof in bearing contact with the tongue.

3. In a vehicle of the class described, a chassis frame, a tongue intermediately pivotally secured to the frame upon a horizontal axis with its forward end extending longitudinally beyond the frame, and a spring mounted upon said frame and providing a yielding bearing for the rear end of the tongue.

4. In combination with the chassis of a trailer of the class described, a U-shaped leg depending from the chassis frame, a U-shaped pedal member hinged to the U-shaped leg, braces extending rearwardly from the insides of the U-shaped leg, apertured brackets provided with forwardly extending cam surfaces, said brackets secured to the inner surfaces of the side members of the U-shaped pedal member, pins extending through said braces and the bottom of the U-shaped leg, said pins adapted to enter the apertures of said brackets when the leg and pedal members are in weight-supporting alignment, washers on said pins, springs coiled about said pins under compression between the braces and the washers, and a rock lever adapted to raise the pins.

5. In combination with the chassis of a trailer of the class described, a prop depending from the forward end of the trailer chassis, said prop comprising a leg portion and pedal portion pivoted together, means for holding the pedal portion clear of the ground, an interlock for securing said leg and pedal portions together in weight-supporting alignment, a draft connection via said leg, a weight-imposing tongue adapted to rest upon a tractor bolster, said tongue pivoted intermediate its ends to the chassis frame, and a spring pivoted to the leg by the same pivot by which is pivoted the pedal member, said spring adapted to support the rearward end of said tongue.

6. In a trailer adapted for a tractor draft connection, in combination with the chassis frame, a weight-imposing tongue the forward end of which is adapted to be supported on the tractor, said tongue being intermediately fulcrumed through the chassis frame, and a rocking spring member also fulcrumed in relation to the said frame forming a support for the rear end of said tongue.

7. In combination with the chassis of a trailer of the class described, a sectional prop for supporting the forward end of the trailer when detached from a tractor, comprising, a limb section of U-form rigidly fixed to and depending from the chassis, and a second limb section of U-form pivotally secured to the opposite sides of said first section and adapted to be locked into extensive alignment therewith, and means for locking said sections together.

In witness whereof, I hereunto subscribe my name.

RUFUS B. JONES.